(12) United States Patent
Redemann et al.

(10) Patent No.: US 7,874,208 B2
(45) Date of Patent: Jan. 25, 2011

(54) SYSTEM FOR AND METHOD OF PROVIDING A WIDE-RANGE FLOW CONTROLLER

(75) Inventors: Eric J. Redemann, Corona Del Mar, CA (US); Chiun Wang, Cypress, CA (US); Thomas Owen Maginnis, Anaheim, CA (US)

(73) Assignee: Brooks Instrument, LLC, Hatfield, PA (US)

( * ) Notice: Subject to any disclaimer, the term of this patent is extended or adjusted under 35 U.S.C. 154(b) by 63 days.

(21) Appl. No.: 12/249,821

(22) Filed: Oct. 10, 2008

(65) Prior Publication Data

US 2009/0095068 A1 Apr. 16, 2009

Related U.S. Application Data

(60) Provisional application No. 60/978,956, filed on Oct. 10, 2007.

(51) Int. Cl.
*G01F 5/00* (2006.01)
*G01F 1/68* (2006.01)

(52) U.S. Cl. ...................................... 73/202; 73/204.21
(58) Field of Classification Search ........................ None
See application file for complete search history.

(56) References Cited

U.S. PATENT DOCUMENTS

| | | | |
|---|---|---|---|
| 3,521,910 A | 7/1970 | Callahan, Jr. et al. | |
| 3,559,482 A | 2/1971 | Baker et al. | |
| 3,938,384 A | 2/1976 | Blair | |
| 4,332,165 A | 6/1982 | Kawai et al. | |
| 4,335,605 A | 6/1982 | Boyd | |
| 4,370,893 A * | 2/1983 | Combes | 73/861.61 |
| 4,425,806 A * | 1/1984 | Van Scoy | 73/861.61 |
| 4,461,173 A | 7/1984 | Olin | |
| 4,517,838 A | 5/1985 | Wachi et al. | |
| 4,519,246 A | 5/1985 | Hartemink | |
| 4,524,616 A * | 6/1985 | Drexel et al. | 73/203 |
| 4,682,496 A | 7/1987 | Miura et al. | |

(Continued)

OTHER PUBLICATIONS

Priestman, Geoffrey H. and Robert F. Boucher, 'The Biased Laminar By-Pass Fluidic Flowmeter,' Journal of Fluids Engineering, Nov. 2005, pp. 1199-1204, vol. 127.

*Primary Examiner*—Harshad Patel
(74) *Attorney, Agent, or Firm*—Sonnenschein Nath & Rosenthal LLP (57) ABSTRACT

An improved flow measuring device, such as a mass flow meter or mass flow controller, providing a high turn-down ratio as compared to prior art devices. In accordance with various embodiments of the invention, a flow sensor includes a sensor flow path that includes one or more restrictions configured to provide the sensor flow path with a non-linear relationship between a pressure drop across the sensor flow path and the flow of fluid through the flow sensor conduit. Such a flow sensor preferably achieves a high turn-down ratio by way of a variable bypass ratio that is directly proportional to the sensor tube mass flow rate so that the turn-down ratio of the mass flow controller will be ideally proportional to the square of the turndown achievable by the flow sensor conduit fluid sensing portion alone. In some embodiments, the restriction can be employed as a part of a fluid seal having an orifice and disposed between a flow sensor portion of a flow meter and a bypass portion of the flow meter.

32 Claims, 7 Drawing Sheets

U.S. PATENT DOCUMENTS

| | | | | |
|---|---|---|---|---|
| 4,685,331 | A | 8/1987 | Renken et al. | |
| 4,800,754 | A | 1/1989 | Korpi | |
| 4,843,881 | A | 7/1989 | Hubbard | |
| 4,876,887 | A | 10/1989 | Mickler | |
| 4,984,460 | A | 1/1991 | Isoda | |
| 4,987,549 | A | 1/1991 | Gee | |
| 5,012,432 | A | 4/1991 | Stetter et al. | |
| 5,036,701 | A | 8/1991 | van der Graaf | |
| 5,285,673 | A | 2/1994 | Drexel et al. | |
| 5,339,687 | A | 8/1994 | Gimson et al. | |
| 5,347,861 | A | 9/1994 | Satoh | |
| 5,359,878 | A | 11/1994 | Mudd | |
| 5,373,737 | A | 12/1994 | Hwang | |
| 5,379,630 | A | 1/1995 | Lacey | |
| 5,460,039 | A | 10/1995 | Cutler | |
| 5,461,913 | A | 10/1995 | Hinkle et al. | |
| 5,509,306 | A | 4/1996 | Yamamoto et al. | |
| 5,696,321 | A | 12/1997 | Igarashi et al. | |
| 5,753,815 | A | 5/1998 | Murata | |
| 5,758,910 | A | 6/1998 | Barber et al. | |
| 5,763,774 | A | 6/1998 | Ha et al. | |
| 5,803,507 | A | 9/1998 | Vu | |
| 5,868,159 | A * | 2/1999 | Loan et al. | 137/334 |
| 6,038,921 | A | 3/2000 | McMillan et al. | |
| 6,094,982 | A | 8/2000 | Suzuki | |
| 6,112,576 | A * | 9/2000 | Tsopelas et al. | 73/25.02 |
| 6,357,760 | B1 | 3/2002 | Doyle | |
| 6,370,950 | B1 | 4/2002 | Lammerink | |
| 6,450,024 | B1 | 9/2002 | McCulloch et al. | |
| 6,564,629 | B2 | 5/2003 | Stark | |
| 6,568,261 | B1 | 5/2003 | Saikalis et al. | |
| 6,575,027 | B1 | 6/2003 | Larsen et al. | |
| 6,681,625 | B1 | 1/2004 | Berkcan et al. | |
| 6,725,166 | B1 | 4/2004 | Luchner | |
| 6,763,710 | B2 | 7/2004 | Mayer et al. | |
| 6,763,711 | B1 | 7/2004 | Nair et al. | |
| 6,805,003 | B2 | 10/2004 | Ueki et al. | |
| 6,829,930 | B2 | 12/2004 | Ismail et al. | |
| 6,840,102 | B2 | 1/2005 | Kouno | |
| 6,843,110 | B2 | 1/2005 | Deane et al. | |
| 6,843,122 | B2 | 1/2005 | Kim et al. | |
| 6,843,123 | B2 | 1/2005 | Tokuhisa et al. | |
| 6,845,984 | B2 | 1/2005 | Doyle | |
| 6,889,544 | B2 | 5/2005 | Tanimoto et al. | |
| 6,928,865 | B2 | 8/2005 | Ito et al. | |
| 6,968,283 | B2 | 11/2005 | Matsumura et al. | |
| 6,988,400 | B2 | 1/2006 | Lotters | |
| 7,000,465 | B1 | 2/2006 | L'Bassi et al. | |
| 7,028,544 | B2 | 4/2006 | Besseling et al. | |
| 7,036,367 | B2 | 5/2006 | Golan | |
| 7,062,965 | B2 | 6/2006 | Immel | |
| 7,066,022 | B2 | 6/2006 | Nikolaus | |
| 7,107,835 | B2 | 9/2006 | Korniyenko et al. | |
| 7,124,647 | B2 | 10/2006 | Tison et al. | |
| 7,155,970 | B2 | 1/2007 | Ariyoshi et al. | |
| 7,363,182 | B2 * | 4/2008 | Tison et al. | 702/100 |
| 7,377,152 | B2 | 5/2008 | Brekelmans et al. | |
| 7,431,045 | B2 * | 10/2008 | Mudd et al. | 137/487.5 |
| 2002/0056318 | A1 | 5/2002 | Kobayashi et al. | |
| 2004/0083807 | A1 * | 5/2004 | Mudd et al. | 73/204.21 |

\* cited by examiner

| Set-Point (%FS) | Random Noise (% FS) | Noise / Signal (n/S) | Uncertainty Spec (E) [%SP] |
|---|---|---|---|
| 1% | 0.1% | 10.0% | 1% |
| 5% | 0.1% | 2.0% | 1% |
| 10% | 0.1% | 1.0% | 1% |
| 20% | 0.1% | 0.5% | 1% |
| 40% | 0.1% | 0.3% | 1% |
| 60% | 0.1% | 0.2% | 1% |
| 80% | 0.1% | 0.1% | 1% |
| 100% | 0.1% | 0.1% | 1% |

Table 1

*FIG. 6*

Graph A

*FIG. 7*

SYSTEM FOR AND METHOD OF PROVIDING A WIDE-RANGE FLOW CONTROLLER

This application claims priority from U.S. Provisional Application No. 60/978,956 filed on Oct. 10, 2007, which is hereby incorporated by reference.

TECHNICAL FIELD OF THE INVENTION

Embodiments of the invention generally relate to systems and methods of measuring and/or controlling flows, and in particular, to flow sensors and flow controllers that can be used to measure and control flow over a wide range of flow rates.

BACKGROUND OF THE INVENTION

Many industrial processes require precise flow sensing and control of various process fluids. For example, in the pharmaceutical and semiconductor industries, mass flow sensors and mass flow controllers are used to precisely measure and control the amount of a process fluid that is introduced to a process chamber. The term fluid is used herein to describe any type of matter in any state that is capable of flow. It is to be understood that the term fluid applies to liquids, gases, and slurries comprising any combination of matter or substance to which controlled flow may be of interest.

Often, a mass flow meter is included as an integral component of a mass flow controller. In a conventional mass flow controller, the mass flow rate of a fluid flowing in a main fluid flow path is regulated or controlled based upon a mass flow rate of a portion of the fluid that is diverted into a typically smaller conduit forming a part of the mass flow sensor. Assuming stable flow in both the main flow path and the conduit of the sensor, the mass flow rate of the fluid flowing in the main flow path can be determined (and regulated or controlled) based upon the mass flow rate of the fluid flowing through the conduit of the sensor.

Figure 1:
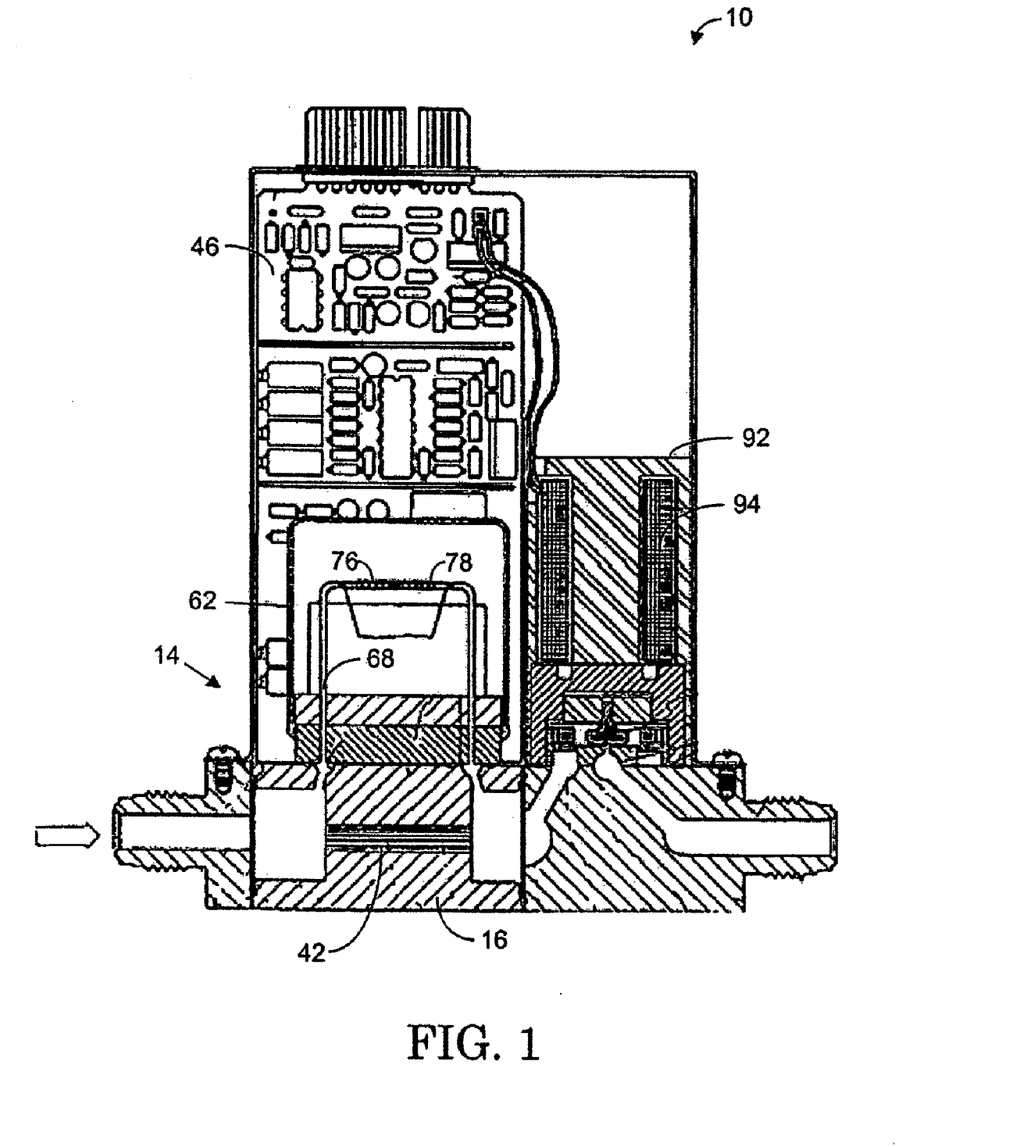
FIG. 1 illustrates a mass flow controller.

FIG. 1 illustrates a conventional mass flow controller 10 which includes a mass flow meter 14 having a mass flow sensor 62 and a pressure dropping bypass 42, a control valve 92, a valve actuator 94, and control electronics 46 (e.g., controller). In operation, the flow meter measures the mass flow rate of a fluid in a flow path and provides a signal indicative of that flow rate. Typically, the measurement of the flow rate is achieved with the flow sensor measuring a portion of the overall flow through the flow meter (e.g., the flow through a flow sensor conduit 68). A control valve is positioned in the fluid flow path (typically downstream of the bypass and mass flow sensor) and can be controlled (e.g., opened or closed) to vary the mass flow rate of fluid flowing through the fluid flow path and provided by the mass flow controller. The valve is typically controlled by a valve actuator, examples of which include solenoid actuators, piezoelectric actuators, stepper actuators, etc. Control electronics control the position of the control valve based upon a set point indicative of the mass flow rate of fluid that is desired to be provided by the mass flow controller, and a flow signal from the mass flow meter indicative of the actual mass flow rate of the fluid flowing in the sensor conduit 68 of the sensor 62. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. In each of the aforementioned feedback control methods, a control signal (e.g., a control valve drive signal) is generated based upon an error signal that is the difference between a set point signal indicative of the desired mass flow rate of the fluid and a feedback signal that is related to the actual mass flow rate sensed by the mass flow meter.

The mass flow sensor 62 measures the mass flow rate of fluid in the sensor conduit 68 that is fluidly coupled to the pressure dropping bypass 42 disposed in the body 16 of the flow meter 14. The mass flow rate of fluid in the sensor conduit is approximately proportional to the mass flow rate of fluid flowing through the bypass, with the sum of the two being the total flow rate through the flow path controlled by the mass flow controller and the ratio of fluid flow through the sensor conduit to fluid flow through the bypass remaining substantially constant.

A thermal mass flow sensor is a type of flow sensor that is commonly employed in a mass flow controller. A thermal mass flow sensor includes a thermal sensing element, for example, a pair of resistive windings (e.g., resistors) 76, 78 that are wound about the sensor conduit 68 at spaced apart positions, each having a resistance that varies with temperature. In general, an electrical current is provided to the resistive windings. The heat generated by the resistive windings is used to heat the fluid flowing through the sensor conduit 68 to a temperature that is greater than the temperature of the fluid flowing through the bypass 42. As is known to those of skill in the art, the preceding approach allows the rate of fluid flowing in the flow sensor 62 to be determined using any one of a number of different methods. For example, a constant current mass flow sensor employs a constant current to each of the upstream and downstream resistors and compares a difference in voltage across the resistors to determine the mass rate of flow of the fluid through the sensor conduit. A constant temperature mass flow sensor maintains the upstream and downstream resistors at the same predetermined value of resistance (and thus, temperature) independently of the rate of fluid flow through the sensor conduit. The difference in energy required to maintain each of the resistors at the predetermined temperature is measured and is proportional to the mass flow rate of fluid flowing through the sensor conduit.

Historically, the accuracy of flow sensors was determined relative to the full scale range of the flow sensor. For example, a flow sensor with a full scale range of 30 sccm has a +1% error where the output of the flow sensor, based on the sensed flow through the flow sensor, is within +0.3 sccm of the actual flow. This traditional approach results in greater accuracy at higher flow rates (relative to the full scale range) with decreasing accuracy at the lower end of the flow range of the flow sensor. That is, in the preceding example, 0.3 sccm is only 1% of the full scale flow but is 10% of a 3 sccm flow. The decrease in accuracy at the low end of the flow sensor range limits the range in which a particular flow sensor can be effectively employed. Further, the preceding illustrates that, where accuracy is determined relative to full scale, a high accuracy at low flows may require a much higher accuracy at high flow rates.

More recently, industries such as semiconductor manufacturing have shifted to a standard in which accuracy of flow sensors is determined relative to the flow set-point. This approach requires greater absolute accuracy at the low end of flow sensor range when compared to the accuracy at the high end of the flow sensor range. For example, where the required accuracy is +1% of the set-point, the required accuracy is +0.03 sccm when the set-point is 3 sccm and +0.3 sccm when the set-point is 30 sccm.

To meet present standards for accuracy, thermal mass flow sensors are typically restricted to a relatively small usable range. For example, the usable range of a flow sensor includes the range of sensed flow in which the sensor can meet the accuracy requirements of the application. The two examples above demonstrate the challenges faced by flow sensor designers to maintain flow sensor accuracy to within specifications regardless of whether accuracy is determined as a percentage of the full scale range of the flow sensor or as a percentage of set-point.

In a conventional flow meter, the split in flow between the flow sensor conduit and the bypass varies approximately linearly with a change in flow. Although it is generally known that a non-linear split-ratio of the flow through the flow sensor conduit and the bypass can be achieved through the use of a single orifice, conventional approaches seek to linearize the output. For example, U.S. Pat. No. 3,559,482, to Baker et al., issued Feb. 2, 1971 and entitled "Fluid Flow Measuring Apparatus," (hereinafter "the '482 patent") describes that a fluid flow to a sensing portion of a flow sensor can be reduced by splitting the flow into three parallel flow paths so that the flow meter can be used to measure a mass flow of much greater magnitude. The '482 patent also describes the use of an orifice plate on an inlet side of a flow sensor flow path (shunt path) in combination with a laminar flow element and a resulting flow in a shunt path that varies as a square root of the flow through the laminar flow element. The '482 patent, however, describes that a square-law meter is employed to provide a net linear output versus flow.

Other structural elements have been included in flow sensors, and in particular in the flow sensor conduit. For example, U.S. Pat. No. 5,763,774, to Ha et al., issued Jun. 9, 1998, and entitled "Fluid Flow Meter with Reduced Orientation Sensitivity," (hereinafter the '774 patent) describes a mass flow sensor including a sensing conduit with a wire disposed therein to reduce the internal diameter of the sensing tube, and consequently, the thermal siphoning through the sensor. The approach described in the '774 patent, however, provides a linear relationship between the pressure drop across the sensor and the flow rate (i.e., the volumetric flow rate) of the sensor flow path.

SUMMARY OF THE INVENTION

In accordance with various embodiments of the invention, a flow sensor includes a fluid flow path that includes a restriction that is configured to provide the fluid flow path with a non-linear relationship between a pressure drop across the fluid flow path and the flow of fluid through the fluid flow path. In accordance with one embodiment, the introduction of the restriction results in a flow meter in which quadratically higher flows are forced through the bypass as the flow increases.

According to some embodiments of the invention, the introduction of an orifice with a nonlinear pressure-flow relationship in the sensor fluid flow path improves the signal to noise ratio of the flow sensor at low set-points. Further, theses embodiments may improve the mass flow controller's turn-down ratio resulting in a mass flow controller with a usable range that is at least an order of magnitude greater than previously known flow sensors.

Further, some embodiments include a flow meter that provides a division of the flow split between the sensor conduit and the bypass in which the flow of the fluid through the sensor conduit varies non-linearly with the total flow of the fluid through the mass flow device.

In one aspect, a flow measuring device includes an inlet, an outlet, a main flow path fluidly coupled between the inlet and the outlet, a pressure dropping bypass disposed in the main fluid path, a flow sensor conduit fluidly coupled between the inlet and the outlet and disposed in parallel with the pressure dropping bypass, a flow sensor configured to sense a flow of the fluid through the flow sensor conduit, and at least one restriction disposed in the sensor flow path where the restriction is configured to provide the sensor flow path with a non-linear relationship between a pressure drop from the inlet to the outlet of the sensor conduit and the flow of fluid through the sensor conduit. In one embodiment, the flow sensor conduit provides a single sensor flow path from an inlet of the flow sensor conduit to an outlet of the flow sensor conduit. In a further embodiment, the single sensor flow path is non-split from the inlet of the flow sensor conduit to the outlet of the flow sensor conduit.

In another embodiment, a flow measuring device includes an inlet, an outlet, a main flow path fluidly coupled between the inlet and the outlet, a pressure dropping bypass disposed in the main fluid path, a sensor flow path fluidly coupled between the inlet and the outlet, where the sensor flow path includes an inlet fluidly coupled to the main flow path and an outlet fluidly coupled to the main flow path in parallel with the pressure dropping bypass, a flow sensor configured to sense a flow of the fluid through the sensor flow path where the flow sensor includes at least one sensing element, a first restriction disposed in the sensor flow path upstream of a location of the sensing element, and a second restriction disposed in the sensor flow path downstream of the location of the sensing element, where the first restriction and the second restriction are configured to provide the sensor flow path with a non-linear relationship between a pressure drop from the inlet to the outlet of the sensor flow path and the flow of fluid through the sensor flow path.

In another aspect, the invention provides a method of providing a flow sensor with a non-linear relationship between a pressure drop across a flow sensor fluid path and a flow of fluid through the flow sensor fluid path. In accordance with one embodiment, the method includes acts of coupling a flow sensor fluid path in parallel with a pressure dropping bypass, locating a flow restriction in a fluid seal, where the flow restriction provides a non-linear relationship between a pressure drop across the flow restriction and the flow of fluid through the flow restriction, and disposing the fluid seal in the flow sensor fluid path to provide the non-linear relationship between the pressure drop across the flow sensor fluid path and the flow of fluid through the flow sensor fluid path.

According to one embodiment, the method includes an act of sealing, with the fluid seal, a connection between the flow sensor fluid path and a second fluid path that includes the pressure dropping bypass. In yet another embodiment, where the flow sensor and pressure dropping bypass are included in a flow meter having a total flow equal to a sum of the flow of fluid through the flow sensor fluid path and a flow of fluid through the second fluid path; the method further includes an act of quadratically splitting the total flow between the flow sensor fluid path and the second fluid path relative to the total flow through the flow meter.

In yet another aspect, a fluid seal is provided for sealing a fluid connection between a flow sensor portion of a flow meter and a bypass portion of the flow meter. According to one embodiment, the fluid seal includes a fluid seal body having an orifice with a diameter that is sized relative to a thickness of a region of the fluid seal body in which the orifice is located such that a flow of fluid through the orifice is non-linear relative to a pressure drop across the orifice resulting from the flow of fluid. According to one embodiment, the fluid seal includes a deformable region configured to be deformed when pressure is applied to opposing sides of the fluid seal. In yet another embodiment, the flow sensor portion of the flow meter includes a first face located about a periphery of a flow sensor conduit, where the bypass portion of the flow meter includes a second face, and wherein the fluid seal is secured between the first face and the second face when the flow meter is assembled.

In a further aspect, a mass flow meter includes a body portion having a bypass configured to receive a pressure dropping bypass element, a flow sensor conduit fluidly coupled to the bypass and a deformable seal including a seal body having an orifice with a diameter that is sized relative to a thickness of a region of the seal body in which the orifice is located such that a flow of fluid through the orifice is non-linear relative to a pressure drop across the orifice resulting from the flow of fluid, where the deformable seal is located at a region of coupling between the flow sensor conduit and the body portion.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION OF PREFERRED EMBODIMENTS

A flow measuring device, such as a mass flow meter or mass flow controller, according to the present invention provides a high turn-down ratio as compared to conventional devices. A turn-down ratio of the overall mass flow controller (MFC) can be defined as a ratio between an amount of fluid flow through the mass flow controller at the maximum operable sensor set-point (which is typically 100% of the full-scale flow as determined above) and an amount of fluid flow through the mass flow controller at the minimum operable sensor set-point. As described in greater detail below, the random noise and the specified error of a sensor can be used to determine the minimum operable sensor set-point. The turn-down ratio provides an indication of the usable range of the mass flow controller. Accordingly, a large turn-down ratio is indicative of a mass flow controller that can measure and control the flow of fluid, within a required accuracy, over a wide range of flows.

In accordance with various embodiments of the invention, a flow sensor includes a sensor flow path (through a flow sensor conduit having a fluid sensing portion) that includes a restriction configured to provide the sensor flow path with a non-linear relationship between a pressure drop across the sensor flow path and the flow of fluid through the flow sensor conduit. Such a flow sensor preferably achieves a high turn-down ratio by way of a variable bypass ratio that is directly proportional to the sensor tube mass flow rate so that the turn-down ration of the mass flow controller will be ideally proportional to the square of the turndown achievable by the flow sensor conduit fluid sensing portion alone. For example, if the flow sensor conduit fluid sensing portion is capable of a 25:1 accurate flow turndown a conventional mass flow controller with conventional bypass would also be expected to be limited to approximately a 25:1 flow turndown, but a mass flow controller according to the present invention could potentially deliver a 625:1 total flow turndown when employing the same sensor over the same sensor flow range.

In embodiments of the present invention, two preferably identical flow restrictors are placed in series with the sensor conduit fluid sensing portion, one immediately upstream, and the other immediately downstream of the sensor conduit fluid sensing portion (although in some embodiments only one restrictor is used). A conventional linear bypass is then connected in parallel with the (orifice+sensor+orifice) series combination. This provides a pressure drop across the sensor flow path that increases as the flow through the flow sensor conduit increases. Accordingly, as flow through the MFC increases, a larger percentage of the flow is diverted to the bypass and thus the percentage of the total flow passing through the bypass increases and the percentage of the total flow passing through the flow sensor conduit decreases. Preferably, the pressure drop across the restriction(s) will be directly proportional to the square of the flow through the sensor conduit. Expressed another way, the pressure drop across the sensor flow path can be described by a polynomial function of the flow through the sensor conduit, with the polynomial function having second order and higher terms predominating.

In contrast, the pressure drop through the bypass will be directly proportional to the flow through the bypass. In other words, the relationship between the pressure drop across the pressure dropping bypass and the flow through the bypass is preferably substantially linear. As a result, as the total flow through the flow measuring device is increased from a lower flow to a higher flow, the increase in the pressure drop across the sensor flow path is proportionately greater than the increase in the pressure drop across the bypass. Preferably, the bypass flow will be directly proportional to the square of the sensor flow. The pressure drop across the sensor flow path per unit flow therethrough, divided by the pressure drop across the bypass per unit flow therethrough, will thus be directly proportionally to the total flow through the flow measuring device. Skilled persons will recognize, of course, that a real-world bypass will typically have some non-linear flow dependence, but it is desirable to provide a bypass so that the ratio of pressure drop to flow is as linear as possible at the highest flows controlled.

Various embodiments and aspects thereof will now be described in more detail with reference to the accompanying drawings. A preferred method or apparatus of the present invention has many novel aspects. Because the invention can be embodied in different methods or apparatuses for different purposes, not every aspect need be present in every embodiment. Moreover, many of the aspects of the described embodiments may be separately patentable. This invention is not limited in its application to the details of construction and the arrangement of components set forth in the following description or illustrated in the drawings. The invention is capable of other embodiments and of being practiced or of being carried out in various ways. The drawings described herein are generally schematic and do not necessarily portray the embodiments of the invention in proper proportion or scale.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items. Although much of the following description is directed at thermal mass flow meters and controllers, the present invention could also be used with any thermal flow meter that provides a signal indicative of flow whether it provides a volumetric flow measurement or a mass flow measurement.

In general, the usable range of a flow sensor is governed by the ratio of the sensor noise level relative to the sensor signal at a specified set-point. The sensor noise level (n) can be determined as a percentage of the full-scale output of the sensor output (% FS). Depending on the sensor design, the sensor noise level may vary as a function of the zero-offset, the residual noise of the electronic circuit and the ambient temperature environment. Also, the sensor signal (S) can be determined as a percentage of the flow sensor full scale output (% FS). Further, the flow sensor can include a specified minimum accuracy, or alternatively, a maximum error (e.g., a maximum expected uncertainty, E) that may be specified in terms of a percentage of the sensor signal. Typically, when the flow sensor is utilized in a closed loop servo control system, such as a mass flow controller, the sensor signal expressed as a percentage of flow sensor full scale output matches the system set-point expressed as a percentage of full scale system flow. Under these conditions, the uncertainty (E) is frequently described as a percentage of set-point (% SP). In this example, the sensor is considered acceptable if the ratio (n/S) is less than or equal to the maximum error.

That is, the sensor is usable over all set-points where:

$$\frac{n}{S} \leq E \qquad (1)$$

Accordingly, for a given maximum error, the usable range of the flow sensor includes all set-points where the ratio of the sensor noise level to the maximum error satisfies Equation 2:

$$\frac{n}{E} \leq S \leq 100\% \qquad (2)$$

The turn-down ratio of a flow sensor is a numerical determination that provides an indication of the span between the maximum and the minimum set-points for which the flow sensor meets a specified accuracy, i.e., for which the flow sensor does not exceed a specified maximum error. In the following example, the turn-down ratio of the flow sensor is determined based on the sensor noise level and the maximum error according to Equation 3:

$$r_{Turn-Down,Sensor} = \frac{100\%}{(n/E)} = \frac{E}{n} \qquad (3)$$

Figure 6:
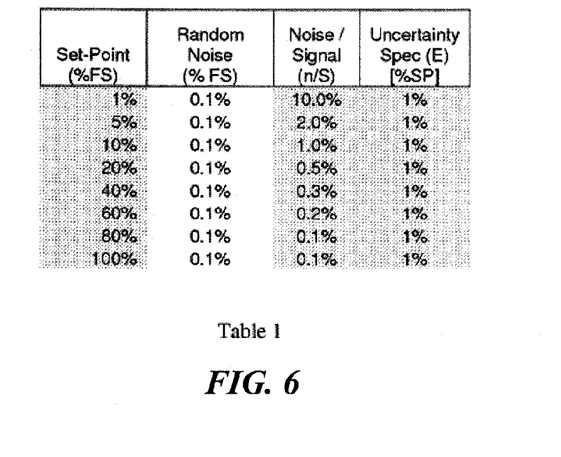
FIG. 6 illustrates an example of operating data of a flow sensor as indicated in Table 1 in accordance with an embodiment.

The following example determination of an exemplary flow sensor turn-down ratio concerns a flow sensor having a random noise level of 0.1% of full-scale output, a specified maximum error of 1.0% and operating data as indicated in Table 1, illustrated in FIG. 6. Applying Equation 2 to the data provided in Table 1, the sensor is usable over the range: $10\% \leq S \leq 100\%$. That is, in this example, the flow sensor has a minimum operable set-point of 10% of the sensor full scale and a maximum operable set-point of 100% of the sensor full scale. Further, the sensor's turn-down ratio is, according to Equation (3):

$$r_{Turn-Down,Sensor} = \frac{1\%}{0.1\%} = 10.$$

Figure 7:
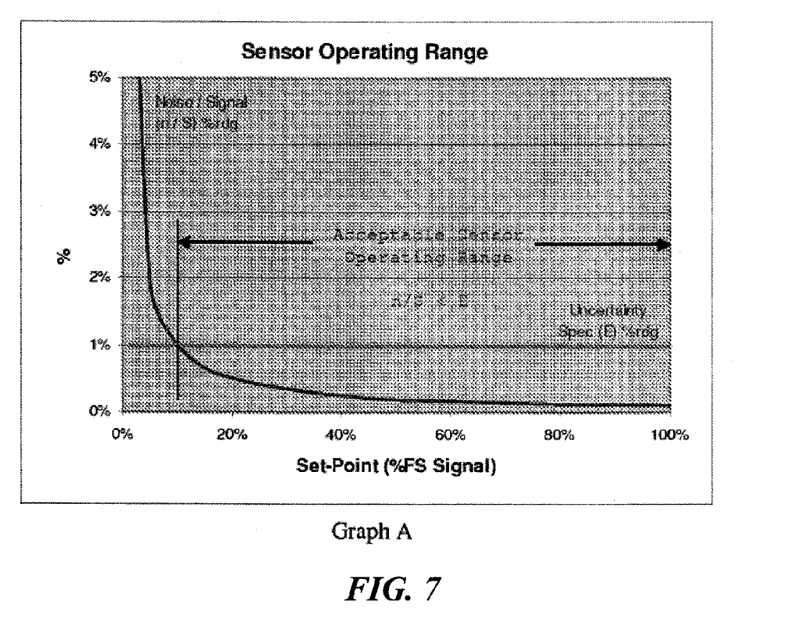
FIG. 7 illustrates an example of the acceptable sensor range for the data indicated in FIG. 6 in accordance with an embodiment.

Graph A, shown in FIG. 7, illustrates the acceptable sensor range in view of the random noise level, specified maximum error (i.e., uncertainty) and operating data as indicated above. As can be seen from the graph, with the random noise and the uncertainty fixed relative to the set-point, the increase in the ratio of the random noise (n) to the set-point may, at low set-point values, establish the low end of the usable range of the flow rates.

In accordance with some embodiments, the turn-down ratio of the mass flow controller is greatly improved over conventional mass flow controllers with the addition of one or more restrictions in a flow path of the flow sensor. For example, a restriction may be added to the flow path of the flow sensor upstream of a location of the sensing element, downstream of the location of the sensing element, or both upstream and downstream of the location of the sensing element. In accordance with one embodiment, the restriction(s) include an orifice. In a further embodiment, the restriction is a micro-orifice, which will be defined herein as having a maximum diameter that is smaller than the internal diameter of the flow sensor conduit, typically from 0.002 to 0.010 inches. A micro-orifice is preferably formed in a formerly solid body (for example by drilling). As used herein, the term "restriction will include orifices and micro-orifices. As also used herein, the term "orifice" will include micro-orifices.

Further, in accordance with preferred embodiments of the present invention, the restriction has a non-linear relationship between the pressure drop across it and the fluid flow through it. Accordingly, some embodiments of the invention employ one or more restrictions in the flow sensor flow path to provide a non-linear relationship between a pressure drop across the flow sensor flow path and the flow of fluid through the flow sensor flow path.

The orifice or micro-orifice may be any of a variety of shapes including round, square, rectangular, and triangular to name a few examples. The shape of the orifice may be a variation on any shape, for example, an elongated version of the shape. Further, the orifice or micro-orifice need not have a symmetrical shape and may include an asymmetrical shape.

In some embodiments, the performance of the orifice is improved where the diameter of the orifice (i.e., the inside diameter) is sized to be greater than or equal to the thickness of the material in which the orifice is located (e.g., the thickness of the material in the area adjacent the orifice). In a further embodiment, the orifice is manufactured such that the edges of the material that forms the orifice are "clean" edges devoid of any substantial jaggedness.

In accordance with one embodiment, the stiffness of the material in which the orifice is formed is considered when determining a minimum orifice diameter. That is, the material in which the orifice is formed must have enough strength to withstand the pressures and flows of the operating environment. In one embodiment, the diameter of the orifice is at least 0.002 inches. In another embodiment, the diameter of the orifice is established based, at least in part, on the inside diameter of a flow sensor conduit (e.g., a tubular conduit). According to one embodiment, the maximum diameter of the orifice is no greater than 30% of the inside diameter of the conduit.

Figure 2:
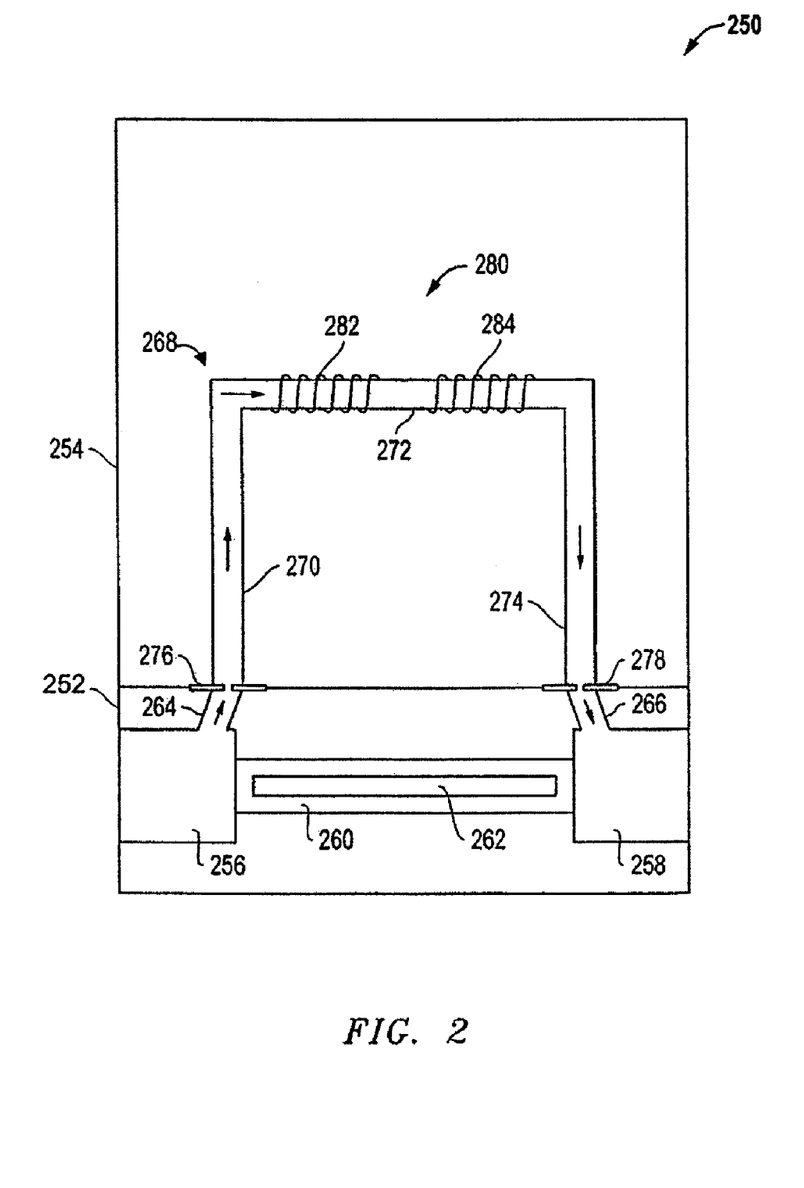
FIG. 2 illustrates a mass flow meter in accordance with an embodiment of the invention.

FIG. 2 provides a simplified illustration of a flow meter 250 in accordance with one embodiment. The illustrated embodiment includes a bypass section 252 and a flow sensor section 254. According to one embodiment, the bypass section 252 includes an inlet 256, an outlet 258 and a bypass 260. In a further embodiment, the bypass 260 includes a pressure dropping bypass element 262. In one embodiment, the pressure dropping bypass element 262 includes one or more tubes. The bypass section 252 also includes an inlet tap 264 and an outlet tap 266. Further, although the use of tubes is mentioned above concerning the pressure dropping bypass element 262, other structures may be employed to provide a flow restriction in the bypass 260. For example, the bypass element may include bundles of tubes, honeycombs, screens, porous plugs, or slots or channels having a rectangular or cylindrical shape. Commonly owned U.S. Pat. No. 7,124,647 to Stuart A. Tison et al. entitled "Slotted Flow Restrictor for a Mass Flow Meter" issued Oct. 24, 2006, further describes the structure of various bypass elements including a slotted bypass element.

According to the illustrated embodiment, the flow sensor 254 includes a sensor conduit 268 including an inlet portion 270, a sensor portion 272 and an outlet portion 274. In one embodiment, the inlet portion 270 of the sensor conduit is connected to the inlet tap 264 of the bypass section 252 and the outlet portion 274 of the sensor conduit is connected to the outlet tap 266 of the bypass section 252. Typically, a thermal sensor 280 including an upstream sensing element 282 and a downstream sensing element 284 is thermally coupled to the flow path provided by the flow sensor conduit 268. In FIG. 2, the sensor portion 272 is illustrated in a horizontal orientation, however, in some embodiments, the sensor portion 272 may be disposed in a non-horizontal orientation. Further, the fluid path of the sensor portion 272 need not be aligned in the same axis as the fluid paths of the inlet portion 270 and the outlet portion 274. For example, in one embodiment, the sensor portion may be oriented orthogonally to either or both of the inlet portion 270 and the outlet portion 274.

According to the illustrated embodiment, the flow sensor and the bypass are connected in parallel within the overall fluid flow path of the flow meter. According to one embodiment, the flow path of the flow sensor, indicated by the shaded arrows, begins at the inlet tap 264. The flow path continues through the inlet portion 270, the sensor portion 272 and the outlet portion 274 of the flow sensor conduit 268. According to the illustrated embodiment, the flow path of the flow sensor is completed at the outlet tap 266 where the flow of fluid originally diverted to the flow sensor at the inlet tap 264 returns to the main flow path at the outlet tap 266. Because the flow sensor and the bypass portion are fluidly connected in parallel, the pressure drop caused by fluid flow in the flow meter results in a pressure drop in the flow sensor conduit and a pressure drop in the bypass whereby the two pressure drops are substantially equal (e.g., identical). Further, in accordance with one embodiment, the tubes of the bypass element include a laminar flow element and the flow in each of the bypass and the flow sensor conduit is substantially laminar.

As used herein, the "flow path of the flow sensor" refers to the flow path of the fluid that flows through the flow sensor conduit and does not flow through the bypass. Accordingly, each of the inlet tap 264, the flow sensor conduit 268 and the outlet tap 266 are included in the flow path of the flow sensor 254 illustrated in FIG. 2.

In accordance with one embodiment, the flow meter 250 includes at least one restriction in the flow path of the flow sensor 254 where the restriction is located in series with the sensing portion 272 of the sensor conduit 268. In various embodiments, the restriction may be located in or before the inlet portion 270, in or after the outlet portion 274, or in both of the preceding locations. In the illustrated embodiment, the flow meter includes a first restriction 276 and a second restriction 278 where the first restriction is located at the junction of the inlet tap 264 and the inlet portion 270, and the second restriction is located at the junction of the outlet tap 266 and the outlet portion 274. In a further embodiment, each of the first restriction 276 and the second restriction 278 include a micro-orifice. As a result, the pressure drop across the flow sensor 254 is non-linear relative to the flow of fluid through the flow sensor.

In one embodiment, the first restriction 276 and the second restriction 278 may be integrated in a fluid seal that is used to provide a leak-free connection between the sensor conduit 268 and the bypass section 252, for example, to prevent the loss of fluid from the flow sensor flow path. That is, each of the first restriction 276 and the second restriction 278 are included in a sealing element that provides a fluid-tight seal at the connection between a portion of a fluid flow path located in the flow sensor portion 254 and a portion of the flow path located in the bypass portion 252 of the flow meter. The first restriction 276 and the second restriction 278 can however, be located elsewhere in the flow path of the flow sensor provided that they are in series with the sensor portion 272 of the fluid conduit. For example, they may be located in any of the inlet tap 264, the outlet tap 266, the inlet portion 270, the sensor portion 272 and the outlet portion 274 of the sensor conduit 268.

In some embodiments, each restriction (e.g., the first restriction 276 and the second restriction 278) includes an orifice that is selected based on the size of the orifice (for example, the diameter of the orifice), and in particular, an orifice sized to introduce a pressure drop of a selected magnitude at a selected flow. In a further embodiment, the orifice is sized to provide a pressure drop, at the flow corresponding to the full scale sensor output, which is greater than the pressure drop within the sensor conduit 268 alone at the same flow. In one embodiment, the size of each orifice is selected such that the pressure drop across each restrictor is at least five times the pressure drop within the sensor conduit 268 at the same flow.

A single restriction or a plurality of restrictions may be employed in various embodiments. It should be recognized that two or more restrictions may be employed including a plurality of restrictions located upstream of the sensing element, a plurality of restrictions located downstream of the sensing element or a combination of each of the preceding. In this regard, Applicants have identified a previously unrecognized problem that makes it advantageous to employ restrictions both upstream and downstream of the sensing element. That is, Applicant(s) have identified benefits associated with the use of both a restriction located upstream of the location of the sensing element 280 and a restriction located downstream of the location of the sensing element 280, e.g., at the inlet and the outlet of the flow sensor portion 254.

For example, Applicant(s) have identified operational problems that result when an orifice is employed at one but not the other of the inlet and the outlet of the flow sensor. Accordingly, some embodiments employ an orifice at both of the inlet and the outlet to overcome these problems. Specifically, where an orifice is employed at one of the inlet or the outlet, a surge in fluid flow may appear in the sensor conduit as a result of a sudden pressure rise that appears at the location where the orifice is not employed (that is, at either the inlet or the outlet) due to process operating conditions. The surge in flow negatively impacts the sensor output, for example, by causing an overshoot or undershoot of the sensor output relative to actual flow (depending on whether the upstream or the downstream orifice is missing) or by delaying a response of the sensor to changes in flow. Each of the preceding is undesirable in a mass flow controller.

In general, the use of a laminar flow element results in a bypass that has a nominally linear relationship between flow and the pressure drop across the bypass. That is, the pressure drop across the bypass 260 can be determined as:

$$\Delta p = c \cdot Q_B \quad (4)$$

where QB is the volumetric flow in the bypass and c is a numerical constant.

In accordance with one embodiment, the total flow through flow meter is the sum of the flow through the bypass (herein referred to as the bypass flow) and the flow through the sensor (herein referred to as the sensor flow). In addition, where the flow meter is included in a mass flow controller the total flow through the mass flow controller equals the total flow through the flow meter, e.g., the sum of the bypass flow and the sensor flow. Typically, the flow sampled by the sensor constitutes only a small fraction of the total flow. For example, a mass flow controller with a total flow of 2000 sccm nitrogen may have a flow split that results in a flow of 10 sccm through the sensor conduit and a flow of 1990 sccm through the bypass. For the preceding example and similar operating situations, the total flow of the mass flow controller is nearly identical to the bypass flow. Thus, according to Equation 4, QB provides a good estimate for the total flow of the mass flow controller.

As described herein various embodiments employ a flow restriction in series with the flow sensor to provide the flow meter with a non-linear relationship between the flow and the pressure drop across the bypass. For example, where the flow sensor conduit has a tubular shape, the addition of a flow restriction in series with the flow sensor results in a pressure drop that can be determined as:

$$\Delta p = a \cdot F_s + b \cdot F_s^2 \quad (5)$$

where Fs is the volumetric flow through the flow sensor and a and b are numerical constants.

The sensor volumetric flow through the sensor (Fs) can be represented as a product of sensor set-point fraction fs and the full-scale sensor flow F0, that is:

$$F_s = f_s \cdot F_0 \quad (6)$$

Replacing Fs in Equation (5) according to Equation 6 results in:

$$\Delta p = a \cdot f_s \cdot F_0 + b \cdot f_s^2 \cdot F_0^2 \quad (7)$$

As described above, the sensor and the bypass are installed in parallel, so they experience an identical pressure drop Δp. Equating Equation 4 with Equation 7 provides:

$$c \cdot Q_B = a \cdot f_s \cdot F_0 + b \cdot f_s^2 \cdot F_0^2 \quad (8)$$

Applying Equation 8 to a mass flow controller with a flow sensor operating at the minimum acceptable sensor set-point $f_s = n/E$, as described above concerning Equation 2, the total flow of the mass flow controller may be determined at its minimum operable set-point QB, Min as:

$$c \cdot Q_{B,Min} = a \cdot \left(\frac{n}{E}\right) \cdot F_0 + b \cdot \left(\frac{n}{E}\right)^2 \cdot F_0^2 \quad (9)$$

Similarly, applying Equation 8 to a mass flow controller with the flow sensor operating at the maximum acceptable sensor set-point fs=1.0, the total flow of the mass flow controller may be determined at its maximum operable set-point QB, Max as:

$$c \cdot Q_{B,Max} = a \cdot F_0 + b \cdot F_0^2 \quad (10)$$

The turn-down ratio of the mass flow controller is determined as the ratio of Equation 10 to Equation 9, that is:

$$R_{Turn-Down,HTD\ MFC} = \frac{aF_0 + bF_0^2}{aF_0 \cdot \left(\frac{n}{E}\right) + bF_0^2 \cdot \left(\frac{n}{E}\right)^2} \quad (11)$$

Equation 11 can be simplified as:

$$R_{Turn-Down,HTD\ MFC} = \frac{(a + bF_0) \cdot \frac{E}{n}}{a + bF_0\left(\frac{n}{E}\right)} \quad (12)$$

Typically, the noise to uncertainty ratio (n/E) is a value that is much smaller than 1. Thus, in most cases, the turn-down ratio for a mass flow controller using a sensor in series with a restriction (e.g., a micro-orifice) can be approximated as:

$$R_{Turn-Down,HTD\ MFC} = \frac{(a + bF_0) \cdot \frac{E}{n}}{a} = \left(1 + \frac{b}{a}F_0\right) \cdot \frac{E}{n} \quad (13)$$

For a conventional mass flow controller using a conventional sensor without any orifice, the constant b is zero. Thus, the turn-down ratio of a conventional mass flow controller reduces to:

$$R_{Turn-Down,Conventional\ MFC} = \frac{E}{n} \quad (14)$$

As mentioned above, a large turn-down ratio is indicative of a mass flow controller that can measure and control the flow of fluid, with the required degree of accuracy, over a wide range of flows. The benefits of employing a restriction become apparent when the turn-down ratios provided by Equations 13 and 14 are compared. In accordance with various embodiments, a mass flow controller that includes a restriction in series with the sensor flow path provides a turn-down ratio (Equation 13) that is at least a factor of ten greater than the turn-down ratio provided by a conventional mass flow controller (Equation 14) by suitably choosing the dimension of a micro-orifice. As can be seen by the preceding, an improved signal to noise ratio at low set-points results from the introduction of an orifice with nonlinear pressure-flow relationship as represented by the last term in Equation 5. Thus, a mass flow controller that includes a flow sensor with such a configuration achieves a much greater turn-down ratio.

The following example further illustrates the benefits of the above-described approach, and in particular, how the inclusion of a restriction in the sensor flow path can increase the turn-down ratio of the mass flow controller by an order of magnitude. In this example, a mass flow controller employs a flow sensor having the following pressure-flow characteristics:

$$\Delta p = a \cdot f_s \cdot F_0 + b \cdot f_s^2 \cdot F_0^2 \quad (15)$$

where the constants a=1, b=1, and the full-scale flow F0 has a value of 10.0.

The turn-down ratio of mass flow controller may be calculated using Equation (13) as:

$$R_{Turn-Down,HTD\ MFC} = \left(1 + \frac{b}{a}F_0\right) \cdot \frac{E}{n} = 11 \cdot \frac{E}{n} \quad (16)$$

The turn-down-ratio of a conventional mass flow controller including a sensor with the coefficient b=0, however is, from Equation 14:

$$R_{Turn-Down,Conventional\ MFC} = \frac{E}{n} \quad (17)$$

Thus, the preceding provides one example in which the mass flow controller equipped with a restriction in the sensor flow path increases the turn-down ratio of the mass flow controller by ten-fold over the turn-down ratio of a conventional MFC.

Figure 3A:
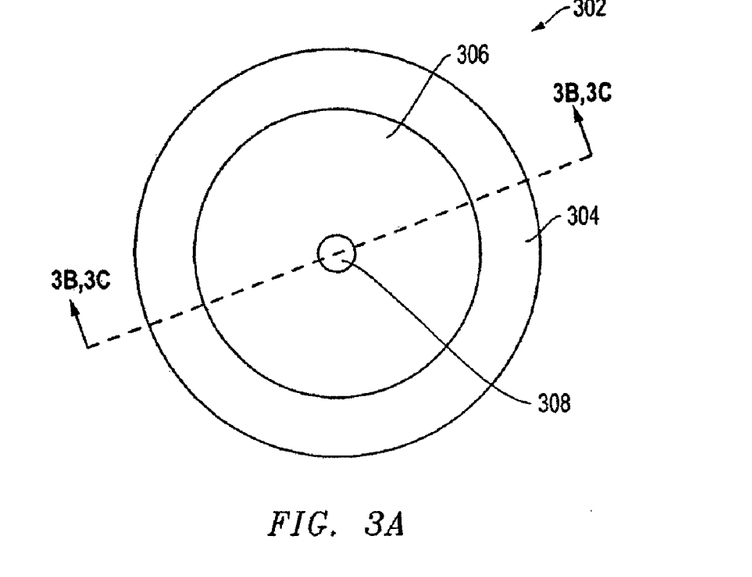
FIG. 3A illustrates a restriction in accordance with an embodiment of the invention.
Figure 3B:
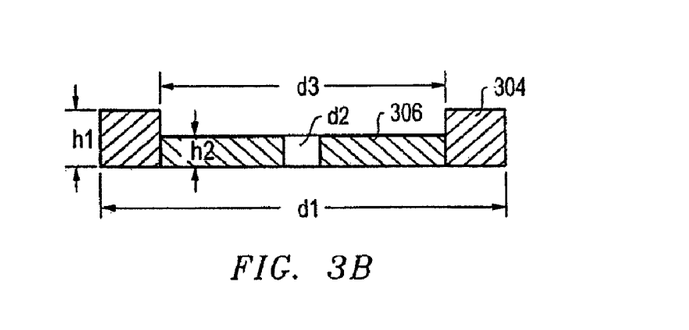
FIG. 3B illustrates a cross-section of the restriction of FIG. 3A in accordance with one embodiment of the invention.

Referring now to FIG. 3, a restriction 302 is illustrated in accordance with one embodiment. In the illustrated embodiment, the restriction 302 includes an outer region 304, a central region 306, and an orifice 308. FIG. 3B illustrates a cross-section of the restriction 302 and makes reference to a set of dimensions concerning the restriction 302 including a first diameter d1, a second diameter d2, and the third diameter d3 where the first diameter d1 is an overall diameter of the restriction 302, the second diameter d2 is a diameter of the orifice 308 and the third diameter d3 is the diameter of the central region 306. FIG. 3B also illustrates the dimensions h1 and h2 where the dimension h1 is the thickness of the outer region and the dimension h2 is a thickness of the central region. As illustrated in FIG. 3, in one embodiment, the thickness h1 of the outer region 304 is greater than the thickness h2 of the central region 306. Further, in one embodiment, the orifice 308 is centrally located in the restriction 302.

In various embodiments, the dimensions are established such that the orifice 308 acts as a micro-orifice. The restriction provides a non-linear relationship between the pressure drop of a flow through the restriction and the flow. In addition, the restriction 302 is designed to provide a very small pressure drop at low flows with an increase in the pressure drop based on a square of the flow velocity. In one embodiment, the restriction 302 has a non-linear performance that diverts a quadratically higher flow to the bypass flow path when the restriction is located in the flow path of the flow sensor.

For example, referring back to FIG. 2, the restrictions 276 and 278 can be provided by respective restrictions corresponding to the restriction 302. In one example, the diameter d2 is 0.003 inches and the pressure dropping bypass element 262 is provided by a quantity of six 0.014" ID bypass tubes that are 1.5 inches long.

In order for one or more restrictions or orifices to produce a quadratic pressure drop as compared to flow in the sensor flow path, several conditions are desirable. First, the orifice flow range (the flow range over which the flow measuring device is operated) should be well above the orifice crossover flow so that the orifice pressure drop itself is a quadratic function of the orifice flow. (The orifice crossover is the flow rate below which flow through the orifice will have a linear relationship to pressure drop.) Second, the flow through the orifice should be laminar at the highest sensor flow required for the fluid in question. This is a condition on the orifice Reynolds number. Third, the flow through the orifice should not be choked. This is a condition on the orifice Mach number. Fourth, the quadratic orifice pressure drop should dominate the linear sensor conduit pressure drop over the required flow range of the sensor. In addition, it is desirable that the bypass flow be laminar, with pressure drop a linear function of the bypass flow, over the very wide flow range corresponding to the square of the sensor flow turndown. As described above, sensor conduit signal/noise ratio will determine how low in flow the sensor conduit may be taken before repeatability is lost.

In some embodiments, the restriction 302 can be employed as a seal as illustrated in FIG. 2 such that the restriction performs the function of both a deformable seal and an orifice. In accordance with versions of that embodiment, the region h1 is thicker than the region h2 such that there is sufficient material in the region h1 to allow it to be deformed between the mounting flanges of the fluid components while continuing to provide a fluid tight seal between the flow path and the ambient atmosphere. In some embodiments, the thickness h2 is reduced sufficiently such that the diameter of the orifice may be controlled within tight tolerance during fabrication, and the relationship of the dimension h2 and the dimension d2 result in a desired performance of micro-orifice. In other embodiments, the restriction 302 is placed elsewhere in the sensor fluid path and the outer region 304 may not include a thickness h1 greater than the thickness h2. Instead, the regions 304 and 306 will have an equal thickness where the relationship of the dimensions h2 and d2 provide the restriction 302 with a performance of a micro-orifice. That is, the restriction 302 has a uniform thickness h2.

Figure 3C:
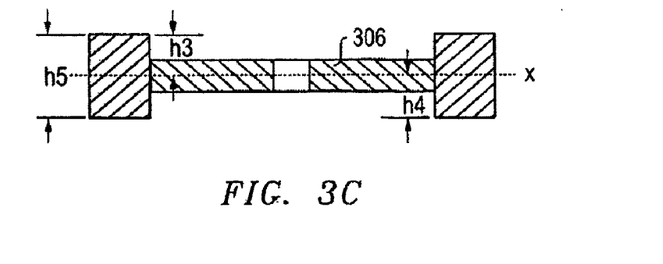
FIG. 3C illustrates a cross-section of the restriction of FIG. 3A in accordance with another embodiment of the invention.

Where, however, the restriction 302 is employed as a fluid seal, the thickness of the outer region 304 may be achieved by a variety of structures and configurations. For example, FIG.

3C illustrates an embodiment of the restriction 302 having a central axis X. According to one embodiment, a thickness h5 corresponds to an overall thickness of the outer region 304 while the dimensions h3 and h4 correspond to a thickness of a first half of the region 304 and a second half of the region 304, respectively. Accordingly, in the illustrated embodiment, the thickness h3 and the thickness h4 are equal. However, in various alternate embodiments, the thickness h3 and the thickness h4 may be different.

In addition, the restriction 302 need not be employed as a seal and instead may be secured elsewhere within the flow path of the flow sensor. For example the restriction 302 may be located within the flow sensor conduit, within the inlet tap, within the outlet tap, etc. Further, the restriction may be disposed in the inlet or outlet as a non-sealing element. In such embodiments, the restriction 302 may have a uniform thickness.

Returning to Equation 5 above and the exemplary comparison provided by Equations 16 and 17, a determination of a pressure drop Δp includes a determination of a first constant a associated with a linear term and a second constant b associated with a quadratic term. As is seen from the preceding, in accordance with one embodiment, a high-turn-down ratio of the mass flow controller results from the addition of a restriction (e.g., a micro-orifice) in the flow sensor flow path because the restriction modifies the pressure-flow characteristics of the flow sensor to include not only the linear term but also the quadratic term. Equation 18 illustrates in greater detail the impact of the restriction on the pressure drop, and in particular, the impact of the dimensions of the restriction on the pressure drop. That is, Equation 18 further demonstrates why an orifice (e.g., a micro-orifice) can be employed to generate a non-linear pressure drop relative to the flow of fluid through a flow sensor. Equation 18 describes a combined pressure drop including a pressure drop Δps across a tubular flow sensor element and a pressure drop across an orifice Δpo, for a given temperature T and a given orifice:

$$\Delta p_{T,Orifice} = \Delta p_s + \Delta p_o = \frac{128 \mu Q L_s}{\pi D_s^4} + \frac{1}{2} \cdot \left(\frac{4}{\pi}\right)^2 \cdot \frac{\rho Q^2}{D_o^4} \quad (18)$$

where Ls is the length of the tubular sensing element, Ds is the inside diameter of the tubular sensing element, μ is the viscosity of the fluid, Do is the inside diameter of the orifice, ρ is the density of the fluid and Q is the volumetric flow rate of the fluid. According to Equation 18, the coefficients a and b corresponding to the linear and the nonlinear terms in Equation (7) are:

$$a = \frac{128\mu L_s}{\pi D_s^4}$$

$$b = \frac{1}{2} \cdot \left(\frac{4}{\pi}\right)^2 \cdot \frac{\rho}{D_o^4}$$

As described above, the size (e.g., diameter Do) of an orifice may be selected to achieve a desired pressure drop relative to a corresponding pressure drop of the sensor conduit alone when subject to the same flow. As should be recognized by those of ordinary skill in the art, the dimensions of the orifice to achieve a desired value of the coefficient b (for example, to achieve a desired turn-down-ratio) vary with the fluid species because the value of the coefficient b also depends on the density of the fluid. Further as should be apparent, the value of the coefficient a too depends on the fluid species because the coefficient a depends on the viscosity of the fluid.

In a preceding example, the use of a single orifice resulted in an order-of-magnitude increase in the turn-down ratio of a conventional mass flow controller. As should be recognized by those of skill in the art, a plurality of orifices (for example, a first orifice at the inlet of the flow sensor conduit and a second orifice at the outlet of the flow sensor conduit) may be employed to further increase the turn-down-ratio of the mass flow controller. According to one embodiment, the effect of adding further flow restrictors is cumulative. Thus, returning to the above example (Equation 16) the use of a second orifice having characteristics similar to the first orifice may result in a turn-down-ratio of:

$$R_{Turn-Down,HTD\ MFC} = \left(1 + \frac{b_1}{a_1}F_0 + \frac{b_2}{a_2}F_0\right) \cdot \frac{E}{n} = 21 \cdot \frac{E}{n} \quad (19)$$

That is, where the diameters of the first orifice (1) and the second orifice (2) are substantially equal such that the coefficient a2 equals a1 and the coefficient b2 equals b1.

Various embodiments of the invention employ flow restrictions in systems having fluid flow rates that are subsonic and where the flow restrictions are employed in a manner that does not result in a choked flow of the fluid. In accordance with one embodiment, the flow restrictions result in a fluid flow of approximately Mach 0.3.

Figure 4A:
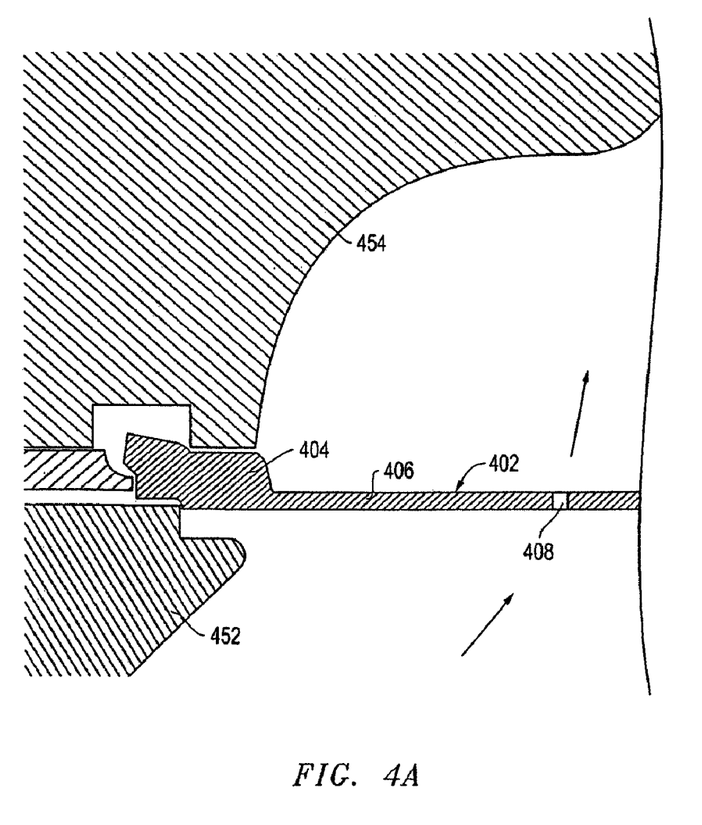
FIGS. 4A-4B illustrate a flow restrictor in accordance with one embodiment.
Figure 4B:
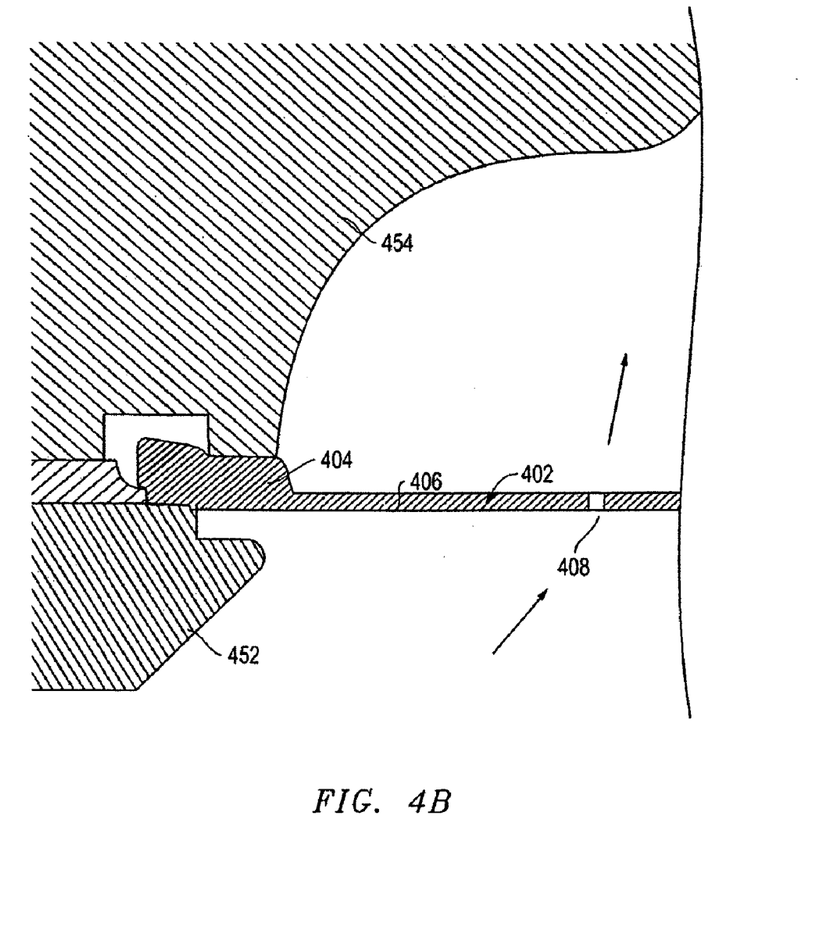

Referring now to FIGS. 4A and 4B, an embodiment of a flow restrictor 402 that also functions as a seal is illustrated. As is shown and described in detail in U.S. Pat. No. 5,803,507 to Kim N. Vu, entitled "Apparatus for Handling Process Fluid" issued Sep. 8, 1998, a removable metal seal that is deformable and provides a connection fitting that is free of leak paths may be provided. The '507 patent is herein incorporated by reference in its entirety, and is attached herewith as Attachment A. The flow restrictor 402 illustrated in FIG. 4A includes an outer region 404, a central region 406, and an orifice 408. As illustrated, the flow restrictor 402 is located such that the outer region 404 is deformed between a first fluid handling component 452 and a second fluid handling component 454 where the fluid path is illustrated by the shaded arrow. In accordance with one embodiment, the first fluid handling component 452 is a bypass section and the second fluid handling component 454 is a flow sensor. In an exemplary embodiment, the bypass 452 and the flow sensor 454 are included in a flow meter. In accordance with one embodiment, the flow meter is included in a mass flow controller.

As illustrated in FIG. 4A, the outer edge 404 of the flow restrictor 402 begins to become deformed as the first fluid handling component 452 and the second fluid handling component 454 are connected together. Referring now to FIG. 4B, a completed fluid-tight connection between the two components is illustrated. As can be seen, the deformation of the outer region 404 provides a fluid-tight seal at the connection between the first fluid handling component 454 and the second fluid handling component 452.

As described above, in accordance with one embodiment, the flow restrictor 402 is a deformable fluid seal. In a further embodiment, the flow restrictor 402 is a deformable metal seal. In a version of this embodiment, the flow restrictor 402 is manufactured of nickel or a nickel alloy, however, other metals such as 316 L stainless steel may be employed. For example, where the first fluid handling component and the second fluid handling component are manufactured from stainless steel, the fluid seal can be manufactured from another metal or metal alloy that has a hardness that is less than the hardness of the component stainless steel. The flow restrictor 402 may be manufactured from non-metals provided the material of the seal is compatible with the process fluids.

Further, the flow restrictor 402 may be manufactured by any of a variety of methods. As one example, individual seals may be cut from a solid cylindrical rod of material. The individual seals may then be machined to have the appropriate dimensions, for example, dimensions such as the thickness of the outer region 404, the thickness of the central region 406 and the diameter of the orifice 408.

As illustrated in FIG. 4B, the flow restrictor 402 may also be employed with a seal retainer 410. In accordance with one embodiment, the seal retainer is manufactured from a material that has a hardness that is greater than the hardness of each of the first fluid handling component 452 and the second fluid handling component 454. As a result, the flat faces of the first fluid handling component 452 and the second fluid handling component 454 will only travel in a direction of the flow restrictor 402 until they reach the corresponding surfaces of the seal retainer 410. According to this embodiment, the seal retainer 410 limits the maximum deformation of the flow restrictor 402 between the two fluid handling components. In some embodiments, the seal retainer 410 is also employed to maintain the flow restrictor 402 in alignment with the fluid path when the first and second fluid handling components are secured together.

Figure 5A:
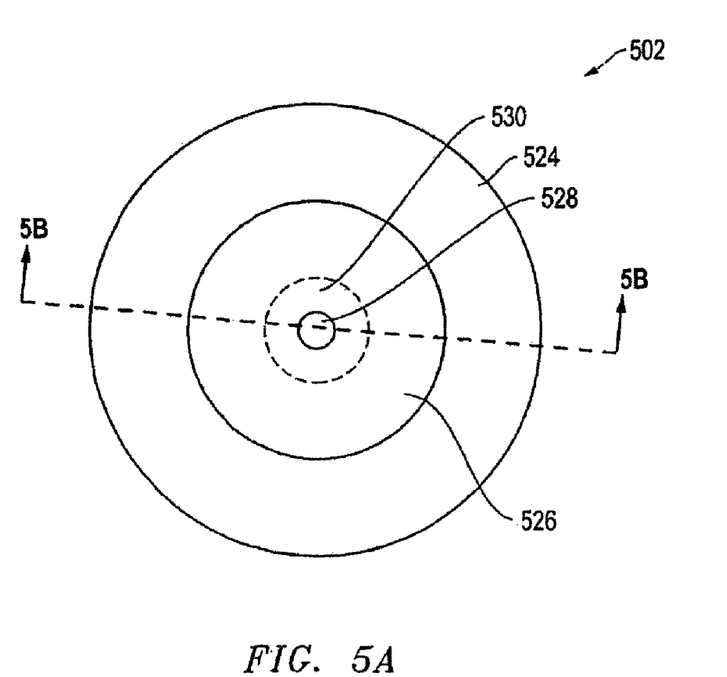
FIGS. 5A-5B illustrate a flow restrictor in accordance with another embodiment.
Figure 5B:
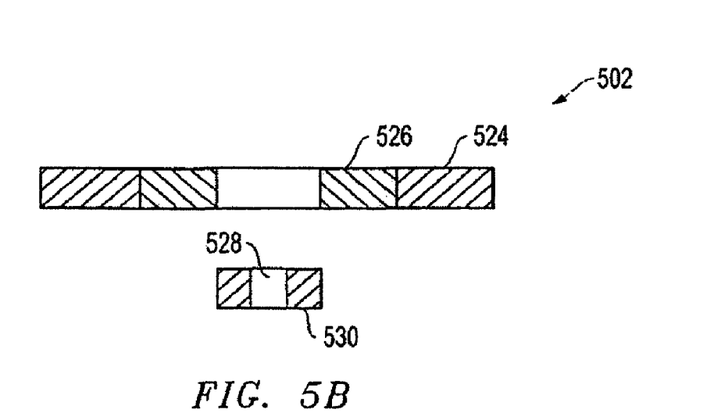

Referring now to FIGS. 5A and 5B a flow restrictor 502 is illustrated in accordance with another embodiment. The flow restrictor 502 includes an outer region 524, an inner region 526 and an orifice 528. In accordance with one embodiment, the outer region 524 is configured to secure the flow restrictor 502 in the flow sensor flow path (e.g., in the flow sensor conduit, at a seal between elements of the mass flow controller, etc.). In some embodiments, the inner region 526 includes an orifice that is provided by a passageway of a selected size that is cut through the inner region. Further, the outer region 524 can also be configured to securely receive a separate inner region 526 that includes the orifice 528 having a desired dimension. In accordance with one embodiment, the inner region includes a sapphire orifice jewel. In accordance with another embodiment, the inner region can be formed from sapphire jewel with an orifice formed through the sapphire jewel material.

In accordance with one embodiment, the flow restrictor 502 is configured such that the outer region 524 may be employed with any one of a variety of inner regions 526 that may have different size orifices relative to one another. As a result, different inner regions 526 may be interchangeably added to the flow restrictor to achieve a desired pressure drop based on the selection of the orifice 528 included in the inner region 526.

In some embodiments, the flow restrictor is included in a seal, for example, a ring seal. In accordance with this embodiment, the ring seal provides the outer region 524 of the flow restrictor 502 while a selected inner region is installed therein. In one embodiment, the inner region 526 includes a sapphire orifice jewel and is selected from a plurality of available inner regions where each includes a sapphire orifice jewel having a different orifice size.

In accordance with a further embodiment, the orifice 528 is included in an insert 530 that can be sealingly retained in the inner region 526. In accordance with this embodiment, the inner region defines an opening that is large enough for the insertion of an insert that includes the orifice 528. FIG. 5B illustrates a cross section of the flow restrictor 502 in accordance with this embodiment in an exploded view. As is illustrated in FIG. 5B, the insert includes a diameter that allows it to be retained within the inner region when the flow restrictor 502 is assembled. For example, the insert 530 may be press fit and/or adhesively secured such that a leak free seal is achieved between the insert 530 and the inner region 526. In accordance with one embodiment, the insert includes a sapphire orifice jewel. Further, the embodiments illustrated in FIGS. 3A-3C may optionally include a central region (e.g., the central region 306) configured to receive an insert that includes an orifice (e.g., the orifice 308) as illustrated in FIGS. 5A and 5B. For example, the central region 306 may be an integral part of the restriction 302 and an insert with a selected orifice may be sealing retained therein.

The preceding approaches that describe the integration of a flow restrictor in a seal may be employed with a wide variety of seals. For example, each of the following U.S. patents describes one or more fluid seals in which an embodiment of the invention may be employed (each of the following patents are herein incorporated by reference in their entirety): U.S. Pat. No. 3,521,910 to F. J. Callahan, Jr. et al., entitled "Tube Coupling" issued Jul. 28, 1970, describes a sealing gasket; U.S. Pat. No. 5,758,910 to Barber et al., entitled "Gasket Assembly for a Fluid Coupling" issued Jun. 2, 1998, describes a generally annular metal gasket; U.S. Pat. No. 6,357,760 to Doyle, entitled "Ring Seal" issued Mar. 19, 2002 describes a ring seal with a center hole; and U.S. Pat. No. 6,845,984 to Doyle, entitled "Keeper for Positioning Ring Seals" issued Jan. 25, 2005 describes a ring seal for use with a keeper where the ring seal includes annularly shaped body having an axially aligned center hole. Embodiments of the invention may include a flow restrictor with any of the preceding fluid seals, for example, by adding an inner region including an orifice to the fluid seal. Or, for example, adding an inner region that is configured to receive a sapphire orifice jewel in sealing engagement with the inner region.

Having described several embodiments of the invention in detail, various modifications and improvements will readily occur to those skilled in the art. Such modifications and improvements are intended to be within the scope of the invention. Accordingly, the foregoing description is by way of example only, and is not intended as limiting.

The scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The figures described herein are generally schematic and do not necessarily portray the embodiments of the invention in proper proportion or scale.

We claim as follows:

1. A flow measuring device comprising:
   a housing with a fluid inlet and a fluid outlet;
   a main flow path fluidly coupled between the inlet and the outlet;
   a pressure dropping bypass disposed in the main flow path;

a flow sensor conduit fluidly coupled between the inlet and the outlet and disposed in parallel with the pressure dropping bypass, said flow sensor conduit providing a sensor flow path from an inlet of the flow sensor conduit to an outlet of the flow sensor conduit;

a flow sensor configured to sense a fluid flow of the fluid through the flow sensor conduit; and at least one restriction disposed in the sensor flow path where the restriction provides a non-linear relationship between a pressure drop across the sensor flow path and the fluid flow through the flow sensor conduit, the at least one restriction comprises an outer portion formed from a material and an orifice passing through the material, wherein the orifice is sized to provide the pressure drop, at a flow corresponding to a full scale sensor output, which is greater than a non-restriction pressure drop within the flow sensor conduit alone at said flow.

2. The flow measuring device of claim 1 in which the flow sensor conduit provides a single sensor flow path from an inlet of the flow sensor conduit to an outlet of the flow sensor conduit.

3. The flow measuring device of claim 2 in which the single sensor flow path is non-split from the inlet of the flow sensor conduit to the outlet of the flow sensor conduit.

4. The flow measuring device of claim 1 in which a first restriction is located upstream of the location of the sensing element and a second restriction is located downstream of the location of the sensing element.

5. The flow measuring device of claim 1 in which the restriction provides a pressure drop across the sensor flow path that increases as the flow through the flow sensor conduit increases, the increase in pressure drop being proportional to the square of the flow velocity through the flow sensor conduit.

6. The flow measuring device of claim 1 in which the restriction has a non-linear performance that diverts a quadratically higher flow to the main flow path relative to the flow through the sensor flow path as the total flow through the flow measuring device is increased.

7. The flow measuring device of claim 1 in which the flow through the main flow path is directly proportional to the square of the flow through the sensor flow path.

8. The flow measuring device of claim 1 in which the relationship between the pressure drop across the pressure dropping bypass and the flow through the bypass is substantially linear.

9. The flow measuring device of claim 8 in which, as the total flow through the flow measuring device is increased, the percentage of the total flow passing through the pressure limiting bypass increases and the percentage of the total flow passing through the flow sensor conduit decreases.

10. The flow measuring device of claim 8 in which, as the total flow through the flow measuring device is increased, the pressure drop across the sensor flow path increases to a greater degree than the pressure drop across the bypass.

11. The flow measuring device of claim 8 in which, as the flow through the flow sensor conduit increases, the pressure drop across the sensor flow path increases to a greater degree than the pressure drop across the bypass increases with a proportionate increase in flow through the bypass.

12. The flow measuring device of claim 1 wherein the pressure drop across the sensor flow path is described by a polynomial function of the flow through the flow sensor conduit, said polynomial function having second order and higher terms predominating.

13. The flow measuring device of claim 1 wherein the pressure drop across the sensor flow path per unit flow therethrough, divided by the pressure drop across the bypass per unit flow therethrough, is directly proportionally to the total flow through the flow measuring device.

14. The flow measuring device of claim 1 further comprising a fluid seal for sealing a fluid connection between the flow sensor conduit and the pressure dropping bypass.

15. The flow measuring device of claim 14 in which the fluid seal includes a fluid seal body having an orifice with a diameter that is sized relative to a thickness of a region of the fluid seal body in which the orifice is located such that a flow of fluid through the orifice is non-linear relative to a pressure drop across the orifice resulting from the flow of fluid.

16. The flow measuring device of claim 15 in which the fluid seal includes a deformable region configured to be deformed when pressure is applied to opposing sides of the fluid seal.

17. The flow measuring device of claim 1 in which the diameter of the orifice is greater than or equal to the thickness of the outer portion.

18. The flow measuring device of claim 1 in which the edges of orifice are substantially smooth.

19. The flow measuring device of claim 1 in which the diameter of orifice is from 0.002 to 0.010 inches.

20. The flow measuring device of claim 1 in which the maximum diameter of the orifice is not greater than 30% of the inside diameter of the flow sensor conduit.

21. The flow measuring device of claim 1 in which the size of each orifice is selected such that the pressure drop across each restrictor is at least five times the pressure drop within the sensor conduit at the same flow.

22. The flow measuring device of claim 1 in which the orifice flow is higher than the orifice crossover flow rate so that the orifice pressure drop itself is a quadratic function of the orifice flow.

23. A flow measuring device comprising:
a housing with a fluid inlet and a fluid outlet;
a main flow path fluidly coupled between the inlet and the outlet;
a pressure dropping bypass disposed in the main fluid path;
a sensor flow path fluidly coupled between the inlet and the outlet, where the sensor flow path includes an inlet fluidly coupled to the main flow path and an outlet fluidly coupled to the main flow path in parallel with the pressure dropping bypass;
a flow sensor configured to sense a flow of the fluid through the sensor flow path where the flow sensor includes at least one sensing element; and
at least one restriction disposed in the sensor flow path, said restriction reducing the flow through the sensor flow path so that, the at least one restriction comprises an outer portion formed from a material and an orifice passing through the material, wherein an orifice flow is higher than an orifice crossover flow rate so that an orifice pressure drop itself is a quadratic function of the orifice flow.

24. The flow measuring device of claim 23 in which the flow through the main flow path is substantially proportional to the square of the flow through the sensor flow path.

25. The flow measuring device of claim 23 in which the flow through the bypass varies as the square of the flow through the sensor flow path.

26. The flow measuring device of claim 23 in which said flow measuring, device has a full working range and in which the ratio of the pressure drop across the flow sensor path to the flow through the flow sensor path is approximately quadratic over the full working range.

27. The flow measuring device of claim 23 in which the pressure drop across the restriction is substantially proportional to the square of the flow through the sensor flow path.

28. A flow measuring device comprising:
a housing with a fluid inlet and a fluid outlet;
a main flow path fluidly coupled between the inlet and the outlet;
a pressure dropping bypass disposed in the main fluid path;
a sensor flow path fluidly coupled between the inlet and the outlet, where the sensor flow path includes an inlet fluidly coupled to the main flow path and an outlet fluidly coupled to the main flow path in parallel with the pressure dropping bypass;
a flow sensor configured to sense a flow of the fluid through the sensor flow path where the flow sensor includes at least one sensing element;
a restriction disposed in the sensor flow path that causes a non-linear relationship between a pressure drop from the inlet to the outlet of the sensor flow path and the flow of fluid through the sensor flow path, the restriction formed from a material and having an orifice passing through the material in which the diameter of orifice is from 0.002 to 0.010 inches.

29. A method of providing a flow meter with a large turn down ratio, the method comprising:
coupling a flow sensor fluid path in parallel with a pressure dropping bypass;
integrating a flow restriction in a fluid seal, the flow restriction and the fluid seal forming a single integrated sealing-orifice component, wherein the flow restriction provides a non-linear relationship between a pressure drop across the flow restriction and the flow of fluid through the flow restriction; and
disposing the fluid seal in the flow sensor fluid path to provide the non-linear relationship between the pressure drop across the flow sensor fluid path and the flow of fluid through the flow sensor fluid path.

30. The method of claim 29 in which the method further comprises sealing, with the fluid seal, a connection between the flow sensor fluid path and a second fluid path that includes the pressure dropping bypass.

31. The method of claim 29 in which the flow sensor and pressure dropping bypass are included in a flow meter having a total flow equal to a sum of the flow of fluid through the flow sensor fluid path and a flow of fluid through the second fluid path; the method further comprising an act of quadratically splitting the total flow between the flow sensor fluid path and the second fluid path relative to the total flow through the flow meter.

32. A mass flow meter comprising:
a body portion having a bypass configured to receive a pressure dropping bypass element;
a flow sensor conduit fluidly coupled to the bypass; and
a deformable seal including a seal body having an orifice with a diameter that is sized relative to a thickness of a region of the seal body in which the orifice is located such that a flow of fluid through the orifice is non-linear relative to a pressure drop across the orifice resulting from the flow of fluid, where the deformable seal is located at a region of coupling between the flow sensor conduit and the body portion.

* * * * *